Figure 9:
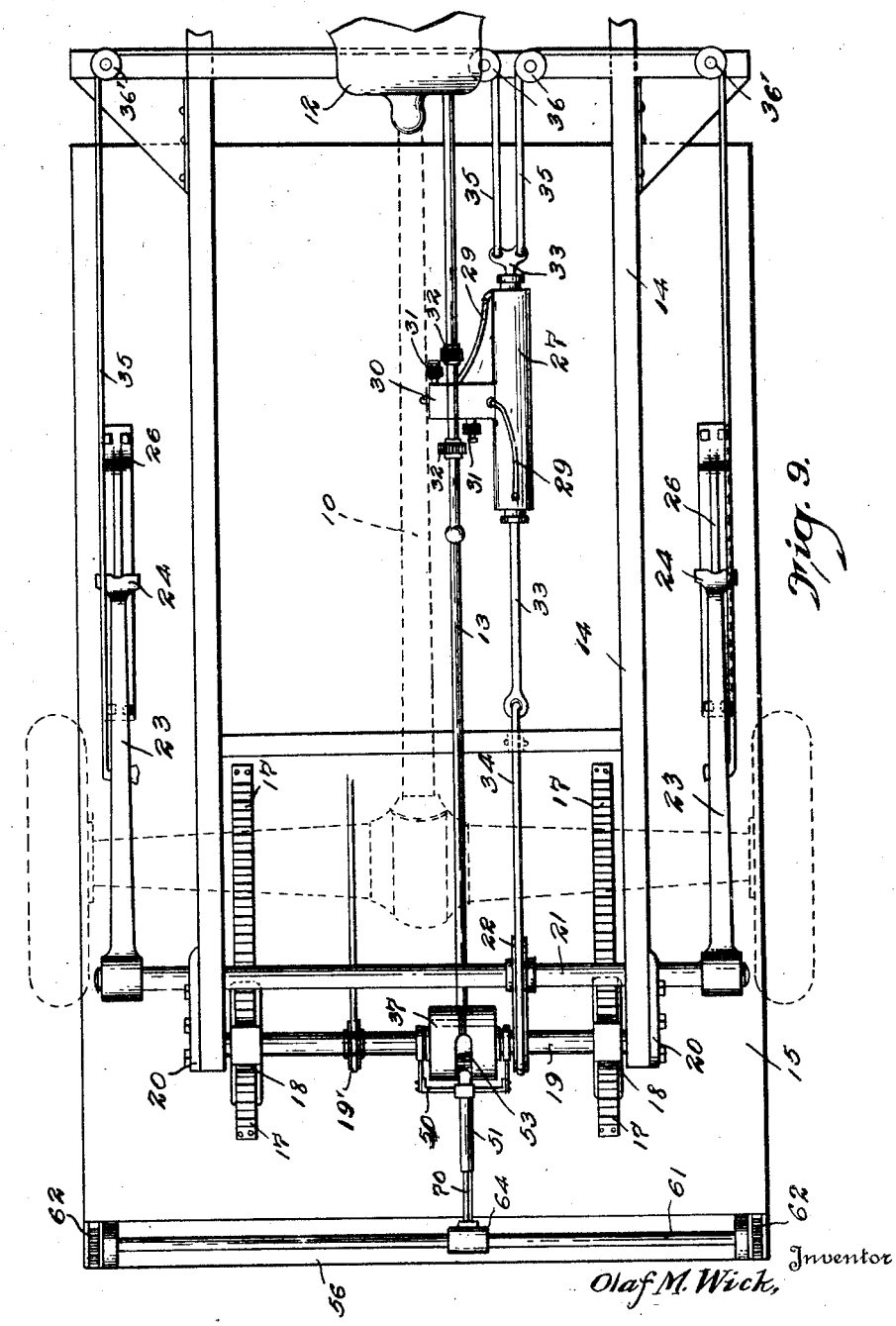

O. M. WICK.
DUMPING TRUCK.
APPLICATION FILED JUNE 15, 1920.
1,429,004.
Patented Sept. 12, 1922.
4 SHEETS—SHEET 1.
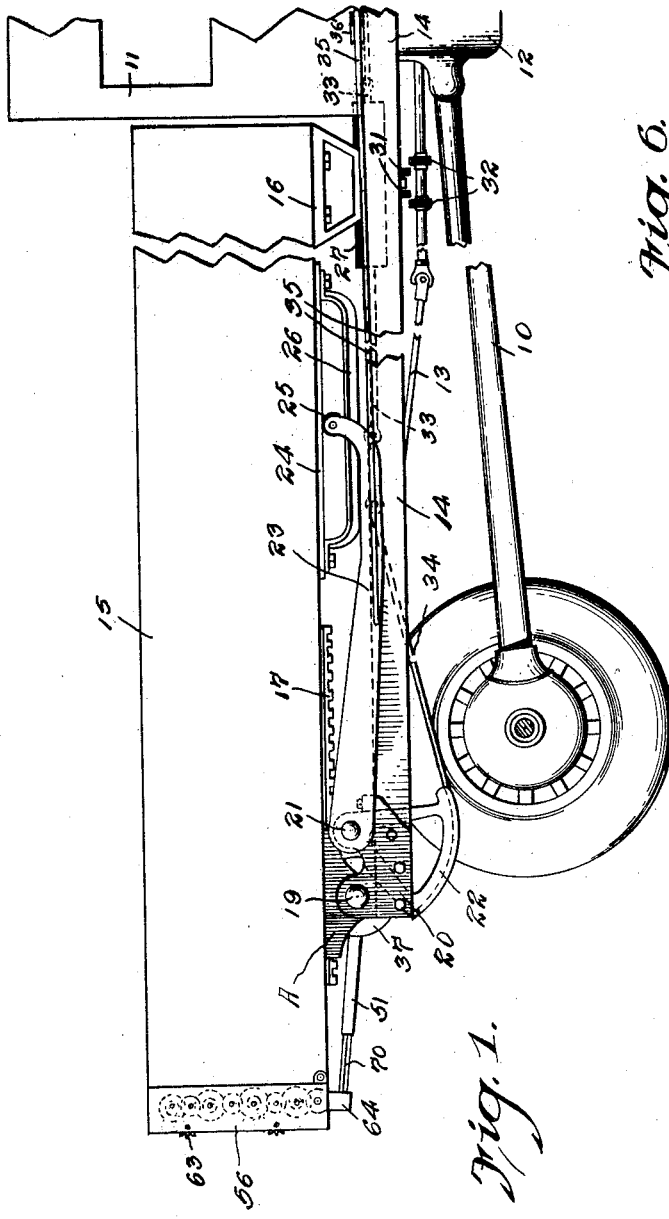
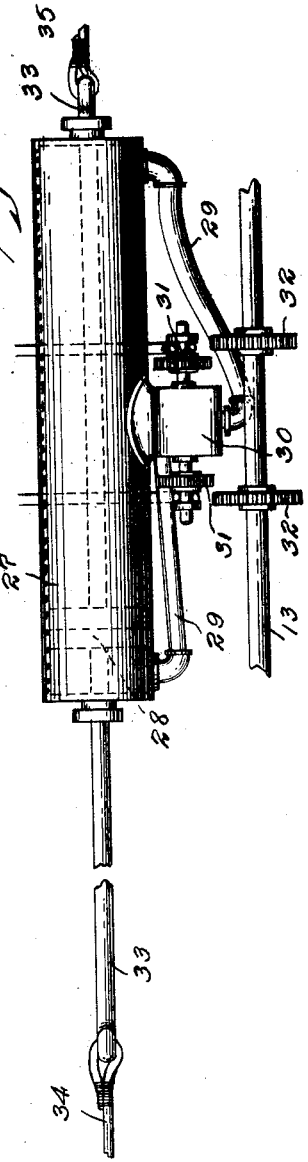
INVENTOR.
Olaf M. Wick,
BY
H. L. Woodward
ATTORNEY.

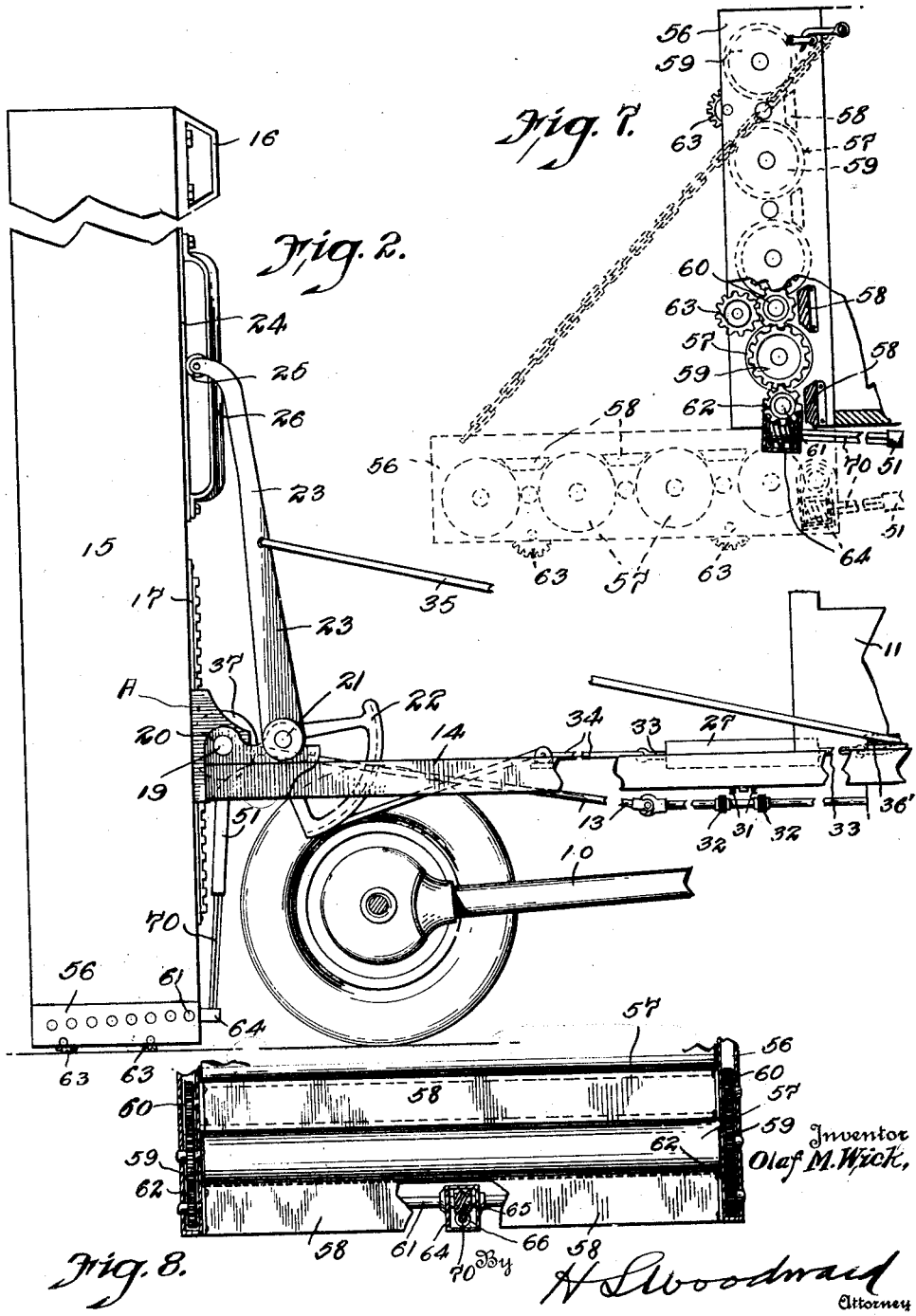

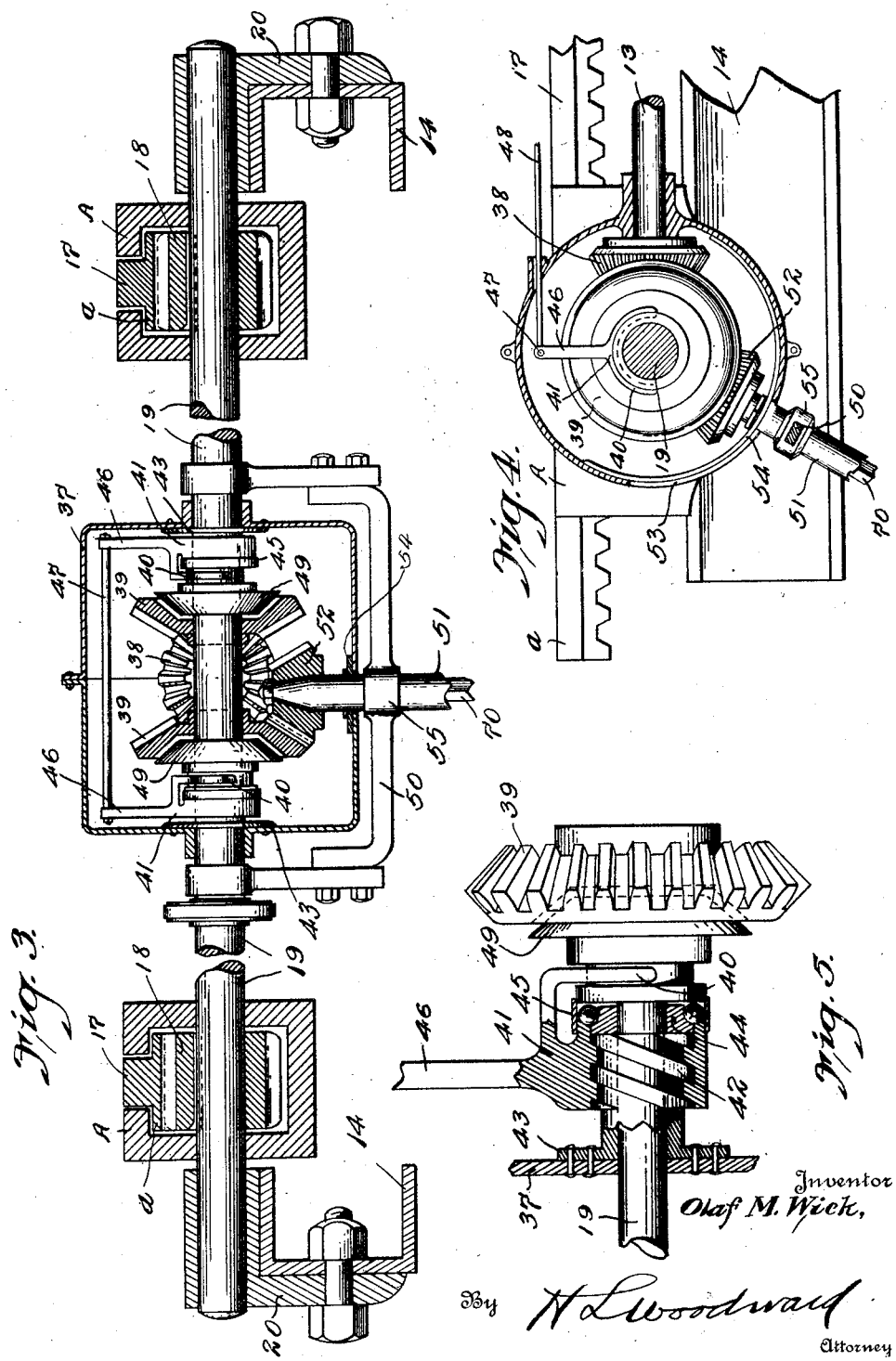

O. M. WICK.
DUMPING TRUCK.
APPLICATION FILED JUNE 15, 1920.

1,429,004.

Patented Sept. 12, 1922.
4 SHEETS—SHEET 4.

Inventor
Olaf M. Wick,
By H L Woodward
Attorney

Patented Sept. 12, 1922.

1,429,004

UNITED STATES PATENT OFFICE.

OLAF M. WICK, OF VALLEY CITY, NORTH DAKOTA.

DUMPING TRUCK.

Application filed June 15, 1920. Serial No. 389,067.

*To all whom it may concern:*

Be it known that I, OLAF M. WICK, a citizen of the United States, residing at Valley City, in the county of Barnes and State of North Dakota, have invented certain new and useful Improvements in Dumping Trucks, of which the following is a specification.

The invention has for an object the attainment of improvements in dumping trucks, whereby loads of bricks, blocks of like material ordinarily requiring to be stacked when delivered may be so discharged and deposited as to be placed in stacked form. Another important aim is to give an improvement in dumping mechanism of such construction that a load may be automatically deposited upon an elevated platform, or upon the ground, as necessary. A further aim is to give an improved form of tilting mechanism for a vehicle body. Another aim is to give a desirable structure for varying the height of the body when in dumping position.

It is also an important aim of the invention to present a novel mechanism for moving a load from a vehicle body. A related object is to so construct this mechanism that it can be used to discharge a load of lumber or a load of blocks, boxes, barrels and other objects.

It is also an aim to effect improvements in the construction of means for accomplishing the several functions of the device, and transmitting power to the various mechanisms.

Other features of invention, as well as advantages, purposes and uses therefor will be understood from the following description and accompanying drawings, in which Figure 1 is a longitudinal sectional view of the rear part of a truck constructed in accordance with my invention, Fig. 2 is a similar view showing the device in discharging position, Fig. 3 is a cross sectional view of the elevating mechanism, as well as power connections with the load moving mechanism, Fig. 4 is a cross section centrally of Fig. 3, Fig. 5 is a detail of the power gear shift for the body tilting or elevating means, Fig. 6 is a formal illustration of the hydraulic device by which the tilting of the body is accomplished, Fig. 7 is a detail of the rear end construction with regard to the means for moving the load, Fig. 8 is a cross section thereof, Fig. 9 is a bottom view of the truck.

There is illustrated the rear portion of a truck chassis 10 which may be provided with any usual power unit and transmission for propulsion, a driver's cab 11 being shown upon the forward part of the chassis. The transmission 12 may include any usual means for communicating motion to an unloader countershaft 13, or any suitable connections may be arranged for transmitting power from the motor to the shaft. The chassis includes a frame portion 14 upon which the shaft 13 is mounted, in a convenient location for the purposes intended. The shaft 13 may be located centrally of the vehicle, or adjacent one side as will appear from the details of construction hereinafter disclosed.

A body 15 is mounted upon the chassis, which may be of any usual form, and preferably includes longitudinal stiffening in its lower part whereby it may be engaged safely by the shifting and tilting devices to be described hereinafter. In the present instance, the forward part of the body when lowered upon the truck is supported by a shoe 16 at each side, which rests upon the adjacent side member of the frame 14. At the rear part, the body is provided with a rack bar 17 at each side, these bars resting upon and meshing with gears 18 keyed upon a transverse shaft 19 the mounting of which and other parts associated therewith are clearly shown in Fig. 3. The shaft is supported at each end in bearing blocks 20 bolted to the side members of the frame 14, and these bearing members also include a suitable bearing portion for a shaft 21 located forwardly of the shaft 19. A brake 19' is provided to control movement of the shaft 19. At a suitable point out of line with the shaft 13, a sector 22 is secured upon the shaft 21, and adjacent each end of the shaft 21 there are also secured upon it arms 23, having anti-friction wiper devices 25 at their outer ends engaged between suitable bearing plates or bars 24 and 26, both being secured directly upon the bottom of the body 15. The extremities of the arms 23 are furcated as shown in Fig. 9, the lower bar 26 being T-shaped in cross section with the central flange projected away from the wiper, supplying a rigid support for holding the body against tilting too far to the rear, and also for the application of power to return the body to initial position. Means is provided for operating the shaft 19 at 21, whereby the body may be shifted rearwardly and then tilted, or whereby it may be tilted without such shifting. The rack bar 17 is extended forwardly of the shaft 19 a sufficient distance when the body is resting upon the chassis to permit rearward movement of the body a sufficient distance for the rear end of the body to rest upon the ground when tilted to vertical position or inclined, and the bars 24 and 26 are preferably extended a sufficient distance forwardly and rearwardly of the wiper 25 when in initial position to permit of the movement desired. Movement of the shaft 21 to tilt the body is accomplished through the agency of a hydraulic device 27 which may be of any usual construction, but in the present instance, is represented as including a cylinder in which a piston 28 may reciprocate, oil ducts 29 leading from a gear pump 30 into each end of the cylinder outwardly of the piston, the piston being filled with oil and the oil being forced to move in either direction to act upon the piston by means of the gear pump 30, each gear of which is provided with a stub shaft, the shaft of the gears being projected in respective opposite directions from the pump casing, whereby one shaft is located at one side of the casing, and the other shaft at the opposite side. Upon these shafts there are slidably splined gears 31. The pump is preferably located upon the under side of the cylinder 27 so that the gears 31 lie closely above the shaft 13, and equally spaced therefrom, a gear 32 being keyed to the shaft adjacent each of the gears 31, whereby when the said gears 31 are moved alternately into engagement therewith the pump will be operated in respective directions. Any suitable means may be provided for movement of the gears 31 as desired, this not being shown, and preferably being controlled from the cab 11. From each end of the cylinder of the hydraulic device, piston rods 33 are projected; to the outer end of the rear one a cable 34 being attached which is extended rearwardly around the sector 22, to which it is secured at the rear part, the sector being suitably grooved. The forward end of the rod 33 is branched, the branched parts having apertures formed therein for attachment of respective cables 35. The cables 35 are extended forwardly around pulleys 36 and thence laterally around pulleys 36′, adjacent the sides of the frame. The cables are then carried rearwardly and secured to the arms 23. (See Fig. 9.)

The shaft 13 projects into a housing 37 mounted upon the shaft 19 in such manner as to permit the shaft to rotate therein. Within the housing the shaft 13 is provided with a bevel gear 38 closely adjacent the front part of the housing. Within the housing 37, gears 39 are revoluble upon the shaft 19 and are in mesh with the gear 38, and formed at their outer sides with conical friction clutch faces, with which clutch members 49 slidably splined in the shaft are adapted to engage, the members being formed with grooved hubs in which the fingers 40 of shifters 41 are engaged.

Each shifter 41 is formed with an internal worm thread screwed upon a corresponding worm 42 (shown in Fig. 5), receiving the shaft 19 revolubly therethrough, and having a flange portion secured to the wall of the housing 37 as at 43. The worm thus serves as a bearing to carry the housing on the shaft 19, and as a pivotal support for the shifter. A set of balls are disposed between the shifter 41 and the hub of the clutch 49, a race element 44 being provided inwardly of the balls, and a removable retainer ring 45 is engaged upon a suitable boss formed upon the adjacent part of the shifter. The worm elements 42 at both sides of the housing 37 extend in the same direction, so that upon simultaneous pivotal movement of the shifters 41 in one direction, one will be moved inwardly and the other outwardly with respect to the adjacent gears. The clutches are normally so spaced that when in neutral position they will both be clear. The shifters 41 are provided with lever arms 46 connected by a bar 47, an operating rod 48 being extended forwardly from this bar to be operated from any convenient position upon the truck.

A yoke 50 has arms embracing the casing 37 and revolubly mounted upon the shaft 19, this yoke having mounted near its middle a hollow shaft 51 extending through a vertical slot 53 in the rear and lower part of the housing 37. This shaft is thus free to oscillate in the casing with the shaft 19 as an axis. The shaft 51 is offset slightly from the vertical plane of the shaft 13 and has a beveled gear 52 thereon slightly smaller than the gear 38 and meshed with one gear 39. The slot 53 in the housing 37 is closed by a curved plate 54 moved by the shaft 51 when oscillated, lying snugly over the slot 53 and keeping the latter closed at all times.

The body 15 is provided with an end gate 56 (see Fig. 7) pivoted in a suitable manner upon the rear part of the body and having mounted transversely therein a multiplicity of rollers 57, and alternate transverse suitably stiffened and strengthened slats 58, forming the back end wall of the body 15 when closed, the rollers having their peripheries projected slightly beyond the plane of the inner faces of the slats. At the ends of the gate, the shafts of the rollers are provided with small pinions 59, alternated with gears 60 forming a train by which the rollers are caused to move in unison in the same direction. At the outer or back side of the end gate, there is mounted a transverse shaft 61 upon which the small gears 62 are mounted, meshed with the gears 59 of an adjacent roller shaft. Spur wheels 63 are suitably mounted upon the outer longitudinal edge of the gate in mesh with the gear train, the gears 63 projecting outwardly of the gate and adapted to engage the ground to propel the lower part of the body forwardly at times when desired to disengage it from beneath a stacked load. Upon the shaft 61 there is hung a cradle 64, in which there is mounted on the shaft 61 a worm gear 65 meshed with a suitable worm 66, mounted upon a telescopic extension 70 of the shaft 51 engaged slidably in the hollow shaft 51 before mentioned. The shaft 70 is angular in cross section, and the interior of the shaft 51 similarly formed and the shaft 70 is slidably accommodated therein.

The rack bar 17 is formed with longitudinally extending channels in each side, in which there are slidably engaged inwardly projected flanges of retainer yokes A, which are revolubly engaged upon the shaft 19. (See Figs. 3 and 4). The flanges are suitably extended for sliding movement in the channel, and serve to hold the rack bar 17 snugly in engagement with the gear 18, the yoke A embracing the gear, and serving as a guard therefor in addition.

In the operation of the device, it being assumed that the body is in the position shown in Fig. 1, in order to dump a load upon the ground, the rod 48 is moved to connect the shaft 19 to that gear 39 which rotates in such manner as to move the gears 18 for propulsion of the rack 17 rearwardly. As soon as the body has been projected rearwardly a distance sufficient to enable the rear end to rest upon the ground when tilted into vertical position as shown in Fig. 2, the rod 48 is operated to move the clutch shifters 41 to neutral position and the brake 19' then operated to hold the shaft 19 against rotation. One of the gears 32 is then shifted to engage in the proper gear 31 of the pump device 30, so that the cable 34 is drawn forwardly upon the segment 22 thereby raising the arm 23 and bearing the forward part of the body upwardly. If desired, the final extended movement of the body may be accomplished by gradual loosening of the brake, permitting the body to slide downwardly slightly after or as it is elevated. Also, in case a very heavy load is involved and it is desired to relieve the tilting mechanism from strain, the body may be moved rearwardly a greater distance than is necessary to allow the rear end to rest as shown, and after being partly tilted, the clutch devices may be operated to propel it forward slightly so that the rear end will not strike the ground until the body has been tilted to the position desired. When the body rests as shown in Fig. 2, or slightly before, the movement of the rollers 57 will propel the load or whatever part may rest upon the rollers rearwardly, at the same time the spurs 63 propelling the body and vehicle forwardly under the load.

In case a load is to be merely dumped regardless of its order, the gate may be adjusted as shown in Fig. 7, before the operation of the dumping apparatus, and then the shaft 19 operated to move the body rearwardly as far as desired, after which the tilting mechanism may be operated, or both may be operated simultaneously, and the load will slide from the body when it reaches the proper angle.

In case lumber is loaded upon the body, it is preferably adjusted so that a large part of its weight rests upon the rollers 57, and movement of the rollers 57 will then tend to discharge the load without tilting of the body, or after tilting to a slight degree. As it is only necessary to operate the shaft 13 when the body is to be moved toward the rear, or when it is desired to operate the rollers, it will be noted that the permanent driving connection with the shaft 51 will not interfere with the proper operation of the device as described, for the reason that when the body is moved slidably upon the frame, the vertical position of the end gate makes the rotation of the rollers of no effect, and operation of the shaft 13 may be checked after the body has been moved rearwardly to the desired extent. Then the rollers will have no effect upon a stacked or ordered load during the tilting operation, or before it has reached the position at which it is desired to discharge the load.

What is claimed is:

1. In a mechanism of the character described a frame, a revoluble shaft thereon, a tilting body having a pivot coincident with the axis of the shaft, a transmission device revolubly mounted on the shaft, means to hold it against rotation, means therein for rotating said shaft in either direction, a gate element on said body, load moving rollers thereon, a gear train associated with the rollers for operation thereof, and telescopic drive means between said transmission device and train.

2. In a mechanism of the character described, a frame, a revoluble shaft thereon, a tilting body having a pivot coincident with the axis of the shaft, a transmission device revolubly mounted on the shaft, means to hold it against rotation, means therein for rotating said shaft in either direction, a gate element on said body, load moving rollers thereon, a gear train associated with the rollers for operation thereof, telescopic drive means between said transmission device and train, said gate having spur wheels operatively connected with said gear train and projected from the outer side of the gate for engagement with the ground at times for traction.

3. In a mechanism of the character described, a revoluble shaft, a housing revoluble thereon, said shaft extending through the housing, a shaft projected revolubly into said housing at an angle to the first named shaft, and stopping short of the axis of the first shaft, idling gears on the first shaft, a gear on the second named shaft meshed with the idling gears for rotation thereof in opposite directions, and clutch elements slidably secured upon the first named shaft and operatively associated with respective idling gears.

4. In a mechanism of the character described, a driven shaft, a driving shaft an angle thereto, a pinion on the last named shaft, idling gears upon the first named shaft meshed with the pinion, respective clutch means for operatively connecting the idling gears alternatively with the first named shaft, including a reciprocable member on the shaft, stationary worm members having treads extending in the same direction, interiorly threaded members threaded upon the worms and connected in fixed mutual relation, and having connections with the reciprocable members respectively for reciprocation thereof upon oscillation of the operating members, and means to rock the operating members.

5. In a mechanism of the character described, a revolubly mounted shaft, a transmission housing revoluble thereon, a driving shaft projected into said housing at right angles to said first shaft and having a beveled pinion thereon within the housing, beveled gears revoluble upon the first named shaft and meshed with said pinion, means for connecting the gears upon the first named shaft operatively with the first named shaft alternatively, a cradle on the first named shaft, a shaft revoluble therein having a pinion meshed with one of the gears on the first named shaft and having its center nearer to that gear than the other gear on the first named shaft, said housing being slotted for oscillation of the cradle shaft.

6. In an apparatus of the character described a body having an open rear end, a gate therefor pivoted upon a horizontal axis at the lower part of the body and having a load moving mechanism therein, and operative connections for said load moving mechanism including a horizontal shaft extending transversely of the body, a worm gear thereon, a cradle on the shaft, a telescoping counter shaft journalled in the cradle having a worm meshed with said gear, a pivotal support for said telescoping shaft at its end opposite the gate, and operative connections therefor.

7. A tilting body, spur wheels thereon at the rear and extensible operative connections with the spur wheels for the purposes described.

8. A tilting body, load moving rollers at the rear end thereof, operative means therefor, and spur wheels exposed for ground traction at times, operatively associated with the rollers.

9. In a dumping truck, a tiltable slidable body, an end gate therefor having transverse load moving rollers exposed at the inner side of the gate and means to operate the rollers.

10. In a material handling apparatus, a frame, a tiltably and slidably mounted body, a transverse shaft mounted revolubly at the rear end of the frame coaxial with the axis of tilting movement of said body, rack members adjacent respective sides thereof, gears on said shaft in mesh with the rack, means to rotate the shaft and separately operated means for tilting the body.

In testimony whereof I have affixed my signature in presence of two witnesses.

OLAF M. WICK.

Witnesses:
R. J. McDonald,
B. P. Kusch.